US009141423B2

(12) United States Patent
Rao et al.

(10) Patent No.: US 9,141,423 B2
(45) Date of Patent: *Sep. 22, 2015

(54) OPTIMIZED DATACENTER MANAGEMENT BY CENTRALIZED TASK EXECUTION THROUGH DEPENDENCY INVERSION

(71) Applicant: Microsoft Technology Licensing, LLC, Redmond, WA (US)

(72) Inventors: Guruprakash Rao, Redmond, WA (US); Jacob D. Sink, Spokane, WA (US); Joshua Martin, Arlington, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/164,010

(22) Filed: Jan. 24, 2014

(65) Prior Publication Data

US 2014/0165066 A1 Jun. 12, 2014

Related U.S. Application Data

(63) Continuation of application No. 13/196,209, filed on Aug. 2, 2011, now Pat. No. 8,645,957.

(51) Int. Cl.
*G06F 9/46* (2006.01)
*G06F 9/48* (2006.01)
*G06F 9/54* (2006.01)

(52) U.S. Cl.
CPC .............. *G06F 9/4843* (2013.01); *G06F 9/541* (2013.01)

(58) Field of Classification Search
None
See application file for complete search history.

(56) References Cited

U.S. PATENT DOCUMENTS

2002/0143949 A1\* 10/2002 Rajarajan et al. ............. 709/226

\* cited by examiner

*Primary Examiner* — Emerson Puente
*Assistant Examiner* — Dong Kim
(74) *Attorney, Agent, or Firm* — Louise Bowman; Jim Ross; Micky Minhas

(57) ABSTRACT

A Datacenter Management Service (DMS) is provided as a platform designed to automate datacenter management tasks that are performed across multiple technology silos and datacenter servers or collections of servers. The infrastructure to perform the automation is provided by integrating heterogeneous task providers and implementations into a set of standardized adapters through dependency inversion. A platform automating datacenter management tasks may include three main components: integration of adapters into an interface allowing a common interface for datacenter task execution, an execution platform that works against the adapters, and implementation of the adapters for a given type of datacenter management task.

23 Claims, 8 Drawing Sheets

OPTIMIZED DATACENTER MANAGEMENT BY CENTRALIZED TASK EXECUTION THROUGH DEPENDENCY INVERSION

CROSS REFERENCE TO RELATED APPLICATIONS

This application is a continuation of U.S. patent application Ser. No. 13/196,209 filed on Aug. 2, 2011. The disclosures of the parent application are hereby incorporated by reference for all purposes.

BACKGROUND

With the proliferation of networked computing, many computing tasks are increasingly being handled at remote computing resources such as cloud-based services. Datacenters housing a multitude of servers and other specialized computing devices provide businesses with a range of solutions for systems deployment and operation. New technologies and practices are designed to handle the scale and the operational requirements of such large-scale operations. These practices eventually migrate toward private data centers, and are adopted largely because of their practical results.

Managing a datacenter depends on performing datacenter management tasks across multiple technologies across multiple datacenter servers. Challenges with datacenter management include the fact that high number of technologies employed in a typical datacenter may require resources knowledgeable about each technology and the high number of servers employed in a typical datacenter may require that management tasks be employed against many servers. A task that is trivial to perform against one server may quickly become non-trivial when it must be performed against multiple servers at a time. Management tasks often cross technology silos, resulting in even greater complexity as organizational boundaries necessitate that multiple participants be employed in the completion of the task.

Furthermore, a resource that performs a task across one or more technologies may often require broad permissions to perform the task, making the principle of least privilege difficult to employ without requiring that a task involve multiple participants—each with their own limited scope of access per datacenter technology, resource, or server. Moreover, datacenter tasks are not necessarily evenly distributed per technology or server, making resource allocation difficult while minimizing scope of access. In addition, resources with the knowledge to perform tasks across multiple technologies are typically more expensive and difficult to acquire.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automation of datacenter management tasks that are performed across multiple technology silos and datacenter servers or collections of servers. The infrastructure to perform the automation is provided by integrating heterogeneous task providers and implementations into a set of standardized adapters through dependency inversion. A platform automating datacenter management tasks may include three main components: integration of adapters into an interface allowing a common interface for datacenter task execution, an execution platform that works against the adapters, and implementation of the adapters for a given type of datacenter management task.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
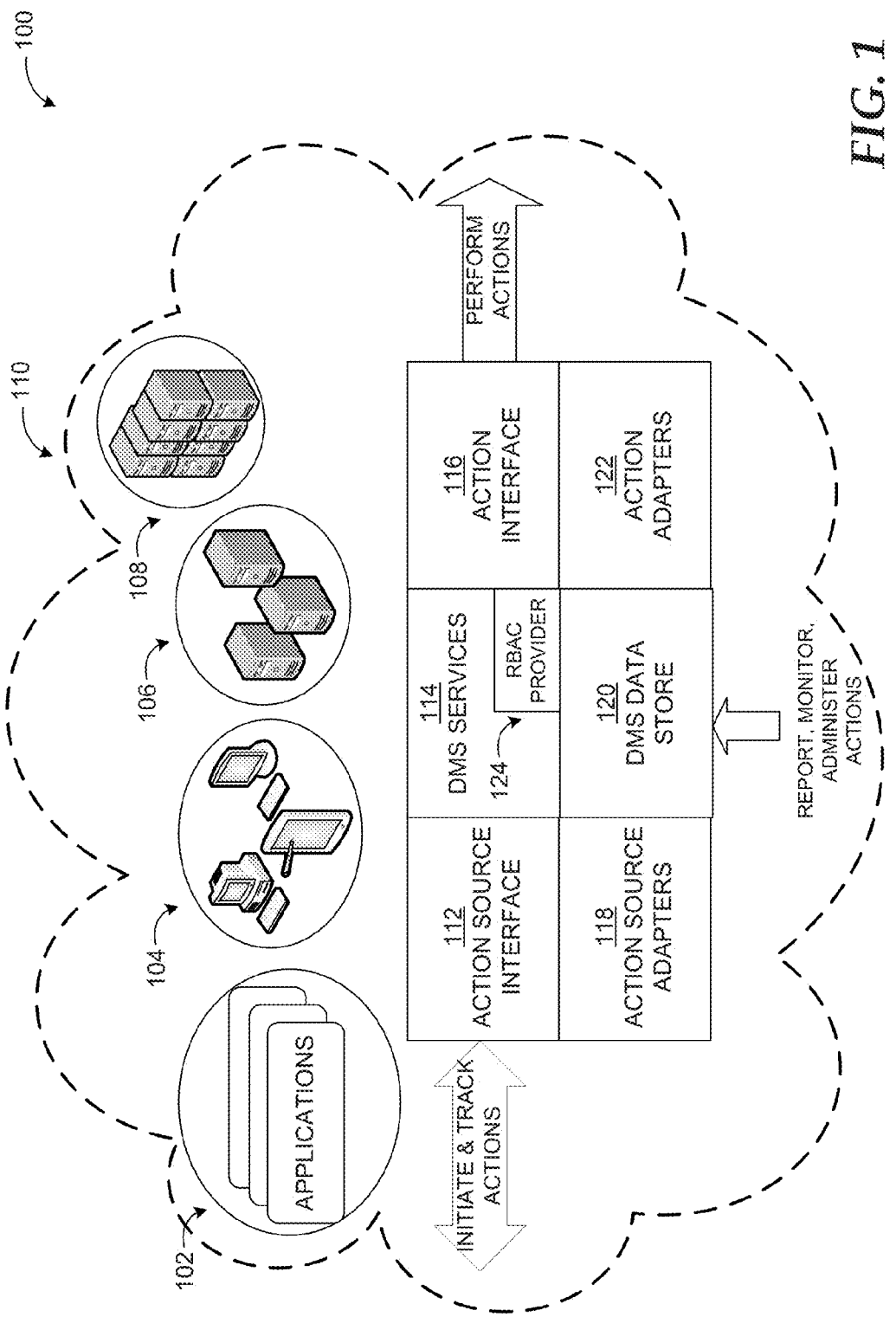
FIG. 1 illustrates an example Datacenter Management Service (DMS) high level architecture describing example components of a system according to some embodiments.

Briefly stated, automation of datacenter management tasks that are performed across multiple technology silos and datacenter servers or collections of servers may be accomplished by abstracting task work and task targets into a unified model that can be permissioned at the task level. Task execution may be performed using a common interface regardless of the technologies or number of servers involved in the task and permissions to perform the task are checked at the task level instead of across the entire scope of resources that participate in the task. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for providing datacenter management services. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates an example Datacenter Management Service (DMS) high level architecture describing example components of a system according to some embodiments. Example components shown in diagram 100 are for illustration purposes. Embodiments may be implemented in various local, networked, and similar computing environments employing a variety of computing devices and systems.

A Datacenter Management Service (DMS) is a system that executes and organizes tasks, known as actions, through two key integration points or adapters. A DMS is commonly implemented through a variety of computing devices including, but not limited to, mainframes 108, servers 106, workstations 104, and so on. A number of applications 102 are executed in the networked environment 110, which may be cloud-based. The collection of computing devices collectively perform tasks associated with DMS services 114, which may involve one or more role based access control (RBAC) providers 124. ActionSource interface 112 enables initiation and tracking of actions, while action interface 116 enables performance of the actions. ActionSource adapters 118 and action adapters 122 may participate in an architecture that utilizes the Inversion of Control (IoC) principle of software design to perform the tasks by dependency inversion in a system according to embodiments. DMS data store 120 enables reporting, monitoring, and/or administration of the actions across the cloud sites and technologies.

In a system according to embodiments, the interfaces enable common interface for all technologies to perform management tasks known as actions against one or more servers. Adapters specific to action initiators (actions sources) or action performers (actions) to be performed from any source against any destination. DMS services 114 enable common runtime for actions against one or more cloud sites from a single initiated action and coordinate actions and ActionSources. RBAC provider 124 may provide access at a per-task, resource, or target level.

Figure 2:
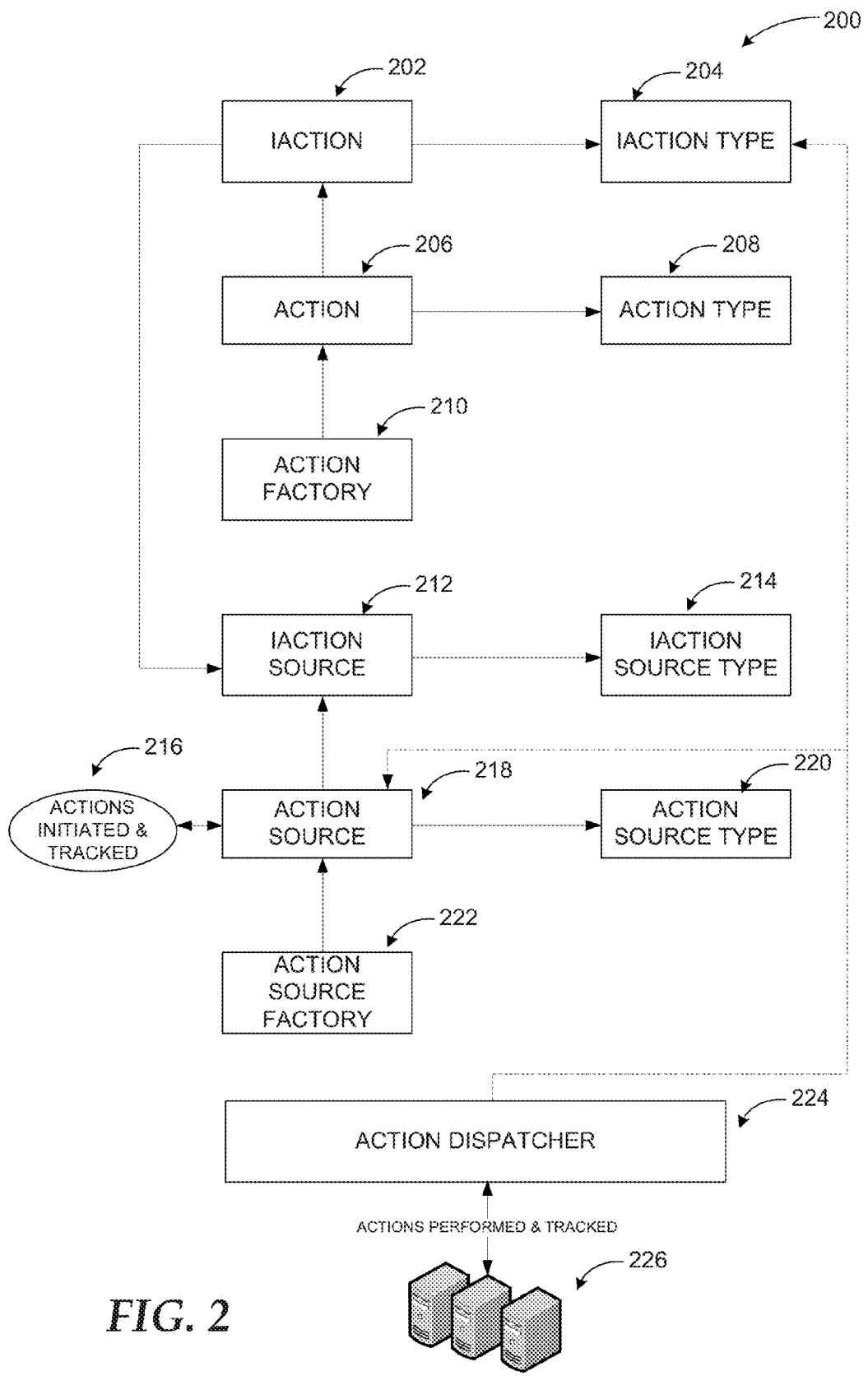
FIG. 2 illustrates example DMS action interfaces and adapters.

Diagram 200 of FIG. 2 illustrates example DMS action interfaces and adapters. The adapters participate in an architecture that utilizes the Inversion of Control (IoC) principle of software design to perform the tasks by dependency inversion. The two integration points or adapters are ActionSource Types 220 and Action Types 208. ActionSource Types 220 is the type of source that can initiate an action. This is the input into the system that initiates automation. Any ActionSource Type may be integrated with DMS through the implementation of the IActionSource 212 and IActionSourceType 214 interfaces in a system according to embodiments. Action Types 208 are the type of action 206 that is executed based on initiation by any ActionSource Type 220. This is the component that does the work for datacenter tasks or incident remediation. Any Action Type 208 may be integrated with DMS through the implementation of the IAction 202 and IActionType 204 interfaces.

Actions may be initiated and tracked (216) through ActionSource 218, which is controlled by ActionSource factory 222. Actions 206 are provided by action factory 210. Action instances implemented by the Action Type 208 contain the code for remote manageability. An action is initiated through the Action Dispatcher API 224 by any application or service executed on one or more servers 226.

Figure 3A:
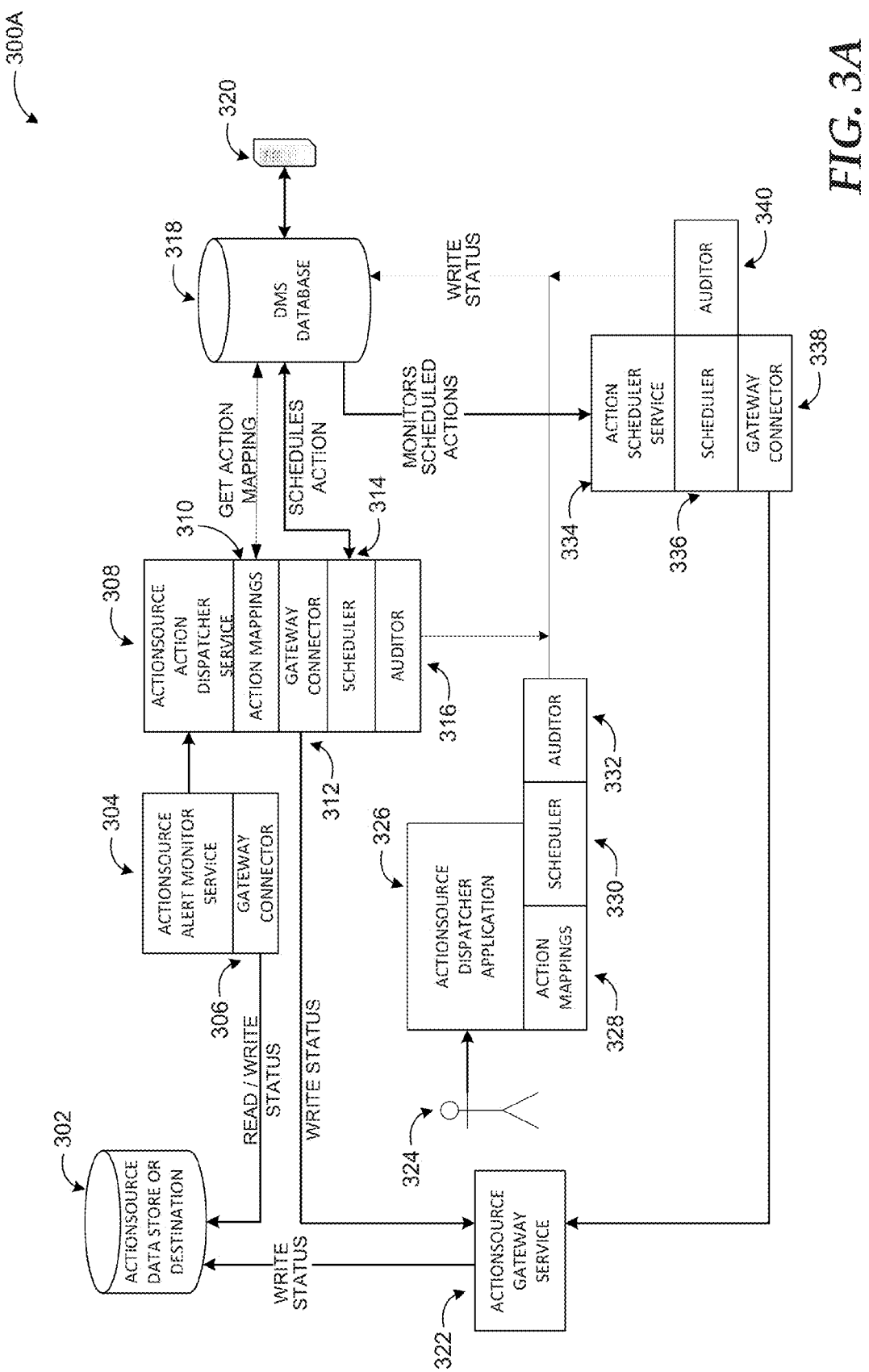
FIGS. 3A and 3B illustrate example components and their interactions in a system according to embodiments.
Figure 3B:
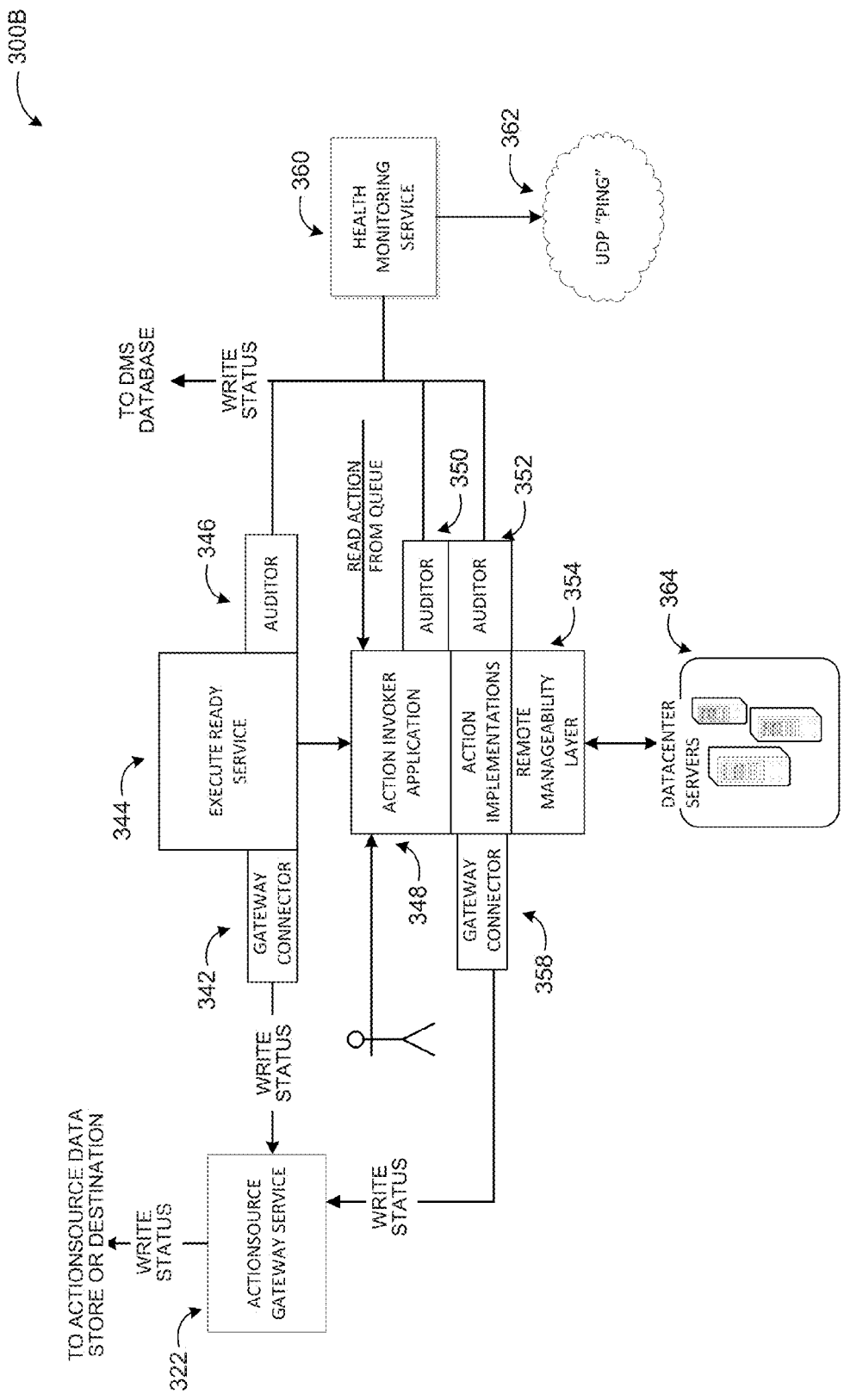

FIGS. 3A and 3B illustrate example components and their interactions in a system according to embodiments. The configuration, organization, orchestration, integration, and execution of the integration points enables a system according to embodiments to address datacenter automation of management and incident remediation across technology silos and multiple server types and instances in a datacenter. This approach enables a much higher degree of flexibility since the solution is not tied to a single proprietary task implementation model and/or software development kit to handle the integration with new task sources or task implementations. The flexibility means that DMS components such as the Action Invoker Application can integrate with other solutions without requiring the rest of DMS-reducing the risk of solution lock-in. It also means that DMS can implement multiple task sources and providers (ActionSource Type and Action Type implementers and executors) at a much higher level. For example, DMS can use any desired solution provided the key interfaces are implemented to integrate with DMS.

A DMS according to embodiments may include one or more of the following services and applications. ActionSource Monitoring Services optionally monitors an ActionSource type to dispatch Actions and may be implemented per ActionSource integrator. Action Dispatching Services initiates automation for a given IActionSource type and may also be implemented per ActionSource integrator. ActionSource Dispatcher Application may initiate automation from a generic source for any task. According to some embodiments, the ActionSource Dispatcher Application may be a specific implementation of an ActionSource known as an ActionSource that initiates Actions and may be used for 'loose' integrations that do not require a more specific ActionSource. For example, a script may call the ActionSource Dispatcher Application to launch an Action without first having to implement a specific ActionSource. Thus, this component stands apart from the core DMS system or architecture because it serves as an actual client for the system, and may be omitted or made optional for the application.

Action Scheduler Service may schedule Actions for execution. Execute Ready Service may execute the Action Invoker Application for Actions. Action Invoker Application may execute Actions based on their Action Type. ActionSource Gateway Service may make calls and enable connection pooling to ActionSources for logging and status reporting. Health Monitoring Service 360 may log and monitor health of DMS services into DMS data storage. This service may broadcast a UDP message 362 to find DMS services without pre-knowledge of the DMS configuration making it easier to scale and distribute DMS services without having to register them in a data store. Web Service may provide reporting, monitoring, and administration APIs including the ability to execute an Action through the web service. Web Portal may be a UI layer to provide access to the web services for reporting, monitoring, administration, and execution of Actions. Data storage may provide the data source to configure, log, report, monitor, administer, and coordinate DMS services.

These services may be distributed to execute in a multi-server environment to enable scalability as datacenter tasks and servers grow in scale. Multiple instances of the Monitor, Dispatcher, Scheduler, Execute Ready, Action Invoker Application, and ActionSource Gateway services may execute concurrently to scale. For example, the Action Invoker Application may be launched multiple times and run concurrently even on a single server deployment to allow multiple actions to be executed at the same time.

The example system components illustrated in diagrams 300A and 300B may perform following tasks and interactions. Data store 302 (e.g., ActionSource data store) may receive read/write or write status messages from Action-Source monitor service 304 and ActionSource gateway service 322. ActionSource monitor service 304 may be a lightweight service primarily used to dispatch and alert action mapper process for detected new alerts. The service may send the messages to data store 302 through a connector 306. Action dispatcher service 308 may determine if an Action needs to be created for a new alert and initiate that Action. Action Mappings 310 may retrieve action mappings from a DMS database 318 and map an alert type to an Action Type in order to determine what type of Action to schedule. Write status about this group of components may be sent to Action-Source Gateway Service 322 through a connector 312. Scheduler 314 may return an Action instance ID that is used to track and manage the Action instance throughout the system. An alert mapped to an Action instance via ActionSource may reference that Action throughout its lifecycle.

Auditor 316 may provide write status to DMS database 318. DMS web service 320 may monitor, administer, and report through a web portal. Action Scheduler Service 334 may monitor scheduled actions queue and place them in the Execute Ready queue when they are to be executed. Scheduler 336 may retrieve Action Mapping, schedule Actions, and provide write status to DMS database 318 via auditor 340. A connector 338 (e.g., gateway connector) may be used to provide information to ActionSource Gateway Service 322.

Manual tasks may be initiated by authenticated users (324) through ActionSource Dispatcher Application 326 with its Action Mappings component 328, scheduler 330, and auditor 332. These tasks may be added to DMS database 318 in advance. Execute Ready Service 344 may read Action instances from the queue and dispatch one Action per target machine at a time. Write status from Execute Ready Service 344 may be provided to DMS database 318 by auditor 346 and to ActionSource Gateway Service 322 by connector 342.

Action Invoker Application 348 may be executed standalone for testing and run under the credentials of a calling user. PS Executor 354 may act as a remote shell and be used as manageability layer for interacting with datacenter servers 364. In some example implementations, IActionSource implementers may use gateway connectors (e.g., 358) to read and write from Alerts such as writing status and Action ID for pulling history and auditing data from the DMS database 318. Auditors provide a common API to track status, history, and other audit related information concerning Action instances as the move through the system.

The DMS may integrate with its task sources and providers (ActionSource Types and Action Types) by registering ActionSource Types and Action Types in DMS data storage. The registration may include a reference to the assemblies that implement the interfaces for these types and optional initialization parameters. Tasks or incident remediations may be registered in DMS data storage as Action Mappings by a unique ID and associated with an ActionSource Type and an Action Type and optional rules and initialization parameters governing the behavior of the Action Mapping. An action may be initiated through the Dispatcher API by any application or service using the unique Action Mapping ID, and Action-Source and Action data based instances may be created in DMS data storage based on the data in the Action Mapping. Any necessary or optional input arguments may also be provided when the Dispatcher API is called. Rules governing whether or not the action can be created may be applied at this time. Permissions to perform the task through the RBAC Provider may also be performed at this time.

The data based representation of an Action may then be scheduled for execution by the Action Scheduler Service and then subsequently executed by the Execute Ready Service by the Action Invoker. Rules governing whether or not the action can be executed may be applied at this time. Multiple concurrent Actions may be executed by the Execute Ready Serviced based on a configurable pool. In some embodiments, only one action per target server may be executed at a time.

The Action Invoker Application may be called by the Execute Ready Service and provided the data for creating and invoking an instance of an Action. This may be a stateless process so all information for executing the Action may be provided at this time. This also means that the Action Invoker Application can be executed standalone without DMS. The Action Invoker may work against the IAction and IAction-Source interfaces of the Action and ActionSource instances that are created using the 'Inversion of Control' software design enabling any Action Type or any ActionSource Type to be executed and integrated with DMS without requiring DMS code changes. The same approach may also be utilized elsewhere in the system.

The work performed by the Action Invoker may be reported back through the IActionSource of its ActionSource and logged to both DMS data storage and other systems based on the ActionSource implementation. If the Action Invoker is invoked standalone then this information may be forwarded to the console if no specific ActionSource was provided. Other DMS components may also report status using the IActionSource based on where an Action is being processed by the system.

The ActionSource Gateway Service may be utilized if the Action Invoker is called by the Execute Ready Service. This service may make calls to the ActionSource instance and enable features such as connection pooling and enabling indirect communication to an ActionSource in the event that the ActionSource references a task initiator that cannot be called directly by every service in DMS. The Action instance implemented by the Action Type may include the code for remote manageability. This may be performed by using an available remote manageability layer that varies based on the type of Action or task that is needed to perform the work. The history and status of the Action may be logged and available in DMS data storage and task initiator depending on the ActionSource implementation. This information may be made available at any point after the Dispatcher API is called.

Figure 4:
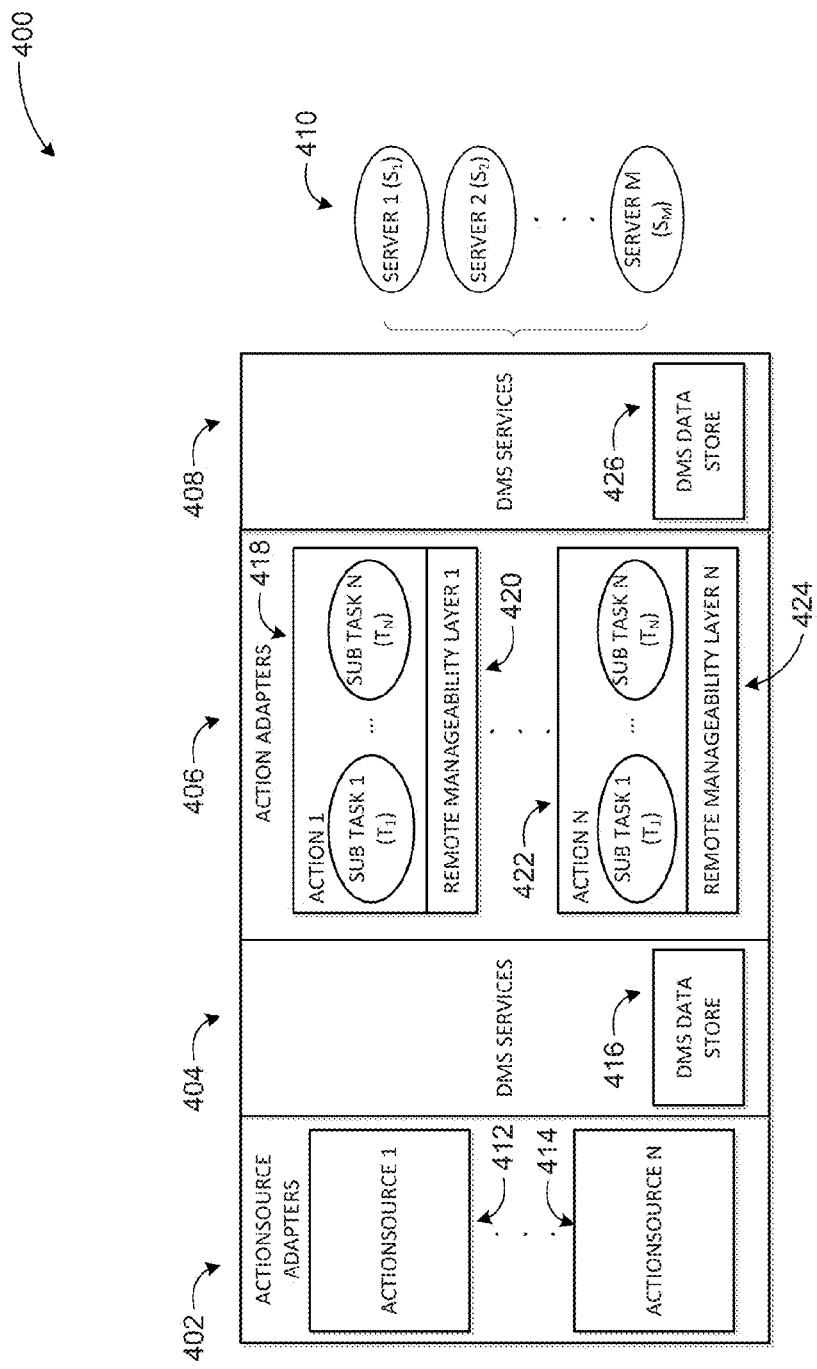
FIG. 4 illustrates conceptually complexity reduction through dependency inversion in a system according to embodiments.

FIG. 4 illustrates in diagram 400 complexity reduction through dependency inversion in a system according to embodiments. The reduction of complexity is for the end user, not in software as implemented by an algorithm. In a conventional system, complexity may be expressed as:

$$f(n,m) = \Sigma T(i) * \Sigma S(j), \quad [1]$$

where the complexity represents n cloud task steps against m servers, each subtask is represented by T(i) and each server is represented by S(i).

In a system according to embodiments, the complexity function may be expressed as:

$$g(n,m) = T(n) + S(m), \quad [2]$$

where ActionSources 1 through N (412, 414) are handled by ActionSource adapters 402 and action adapters 406 handle actions 1 through N (418, 422) with each action having a remote manageability layer (420, 424) and a plurality of subtasks (T(1) through (T(n)). DMS services (404, 408) and DMS data store (416, 426) interact with servers 1 through m (S(m)) 410.

Thus, through centralized integration and handling of datacenter tasks from any task source to any server or servers, integration of adapters into an interface allowing a common interface for datacenter task execution, an execution platform that works against the adapters, and implementation of the adapters for a given type of datacenter management task, complexity levels of datacenter management may be substantially reduced.

The example embodiments in FIG. 1 through 4 are shown with specific components and configurations. Embodiments are not limited to systems according to these example configurations. A DMS with centralized task execution through dependency inversion may be implemented in configurations employing fewer or additional components in business applications. Furthermore, the example architectures, systems and components shown in FIG. 1 through 5 and their attributes may be implemented in a similar manner with other components using the principles described herein.

Figure 5:
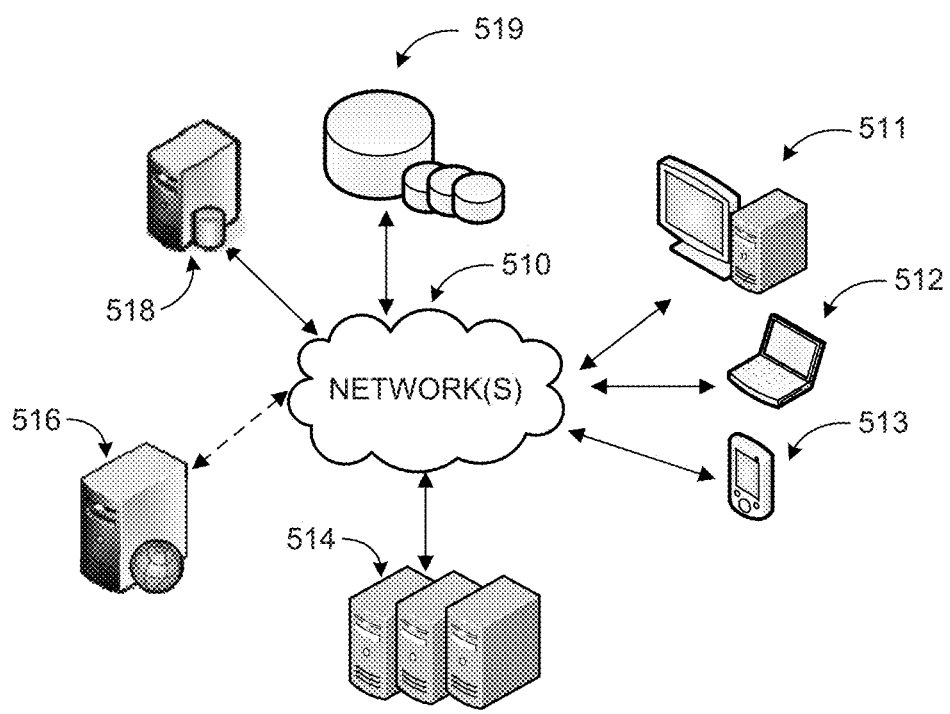
FIG. 5 is a networked environment, where a system according to embodiments may be implemented.

FIG. 5 is a networked environment, where a system according to embodiments may be implemented. A DMS with centralized task execution through dependency inversion may be provided through applications executed over one or more servers 514 or a single server (e.g. web server) 516 such as a hosted service. The service may communicate with applications on individual computing devices such as a smart phone 513, a laptop computer 512, or desktop computer 511 ('client devices') through network(s) 510.

As discussed above, automation of datacenter management tasks that are performed across multiple technology silos and datacenter servers or collections of servers may be accomplished by abstracting task work and task targets into a unified model that can be permissioned at the task level. Task execution may be performed using a common interface regardless of the technologies or number of servers involved in the task and permissions to perform the task are checked at the task level instead of across the entire scope of resources that participate in the task.

Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a DMS with centralized task execution through dependency inversion. Furthermore, the networked environments discussed in FIG. 5 are for illustration purposes only. Embodiments are not limited to the example applications, modules, or processes.

Figure 6:
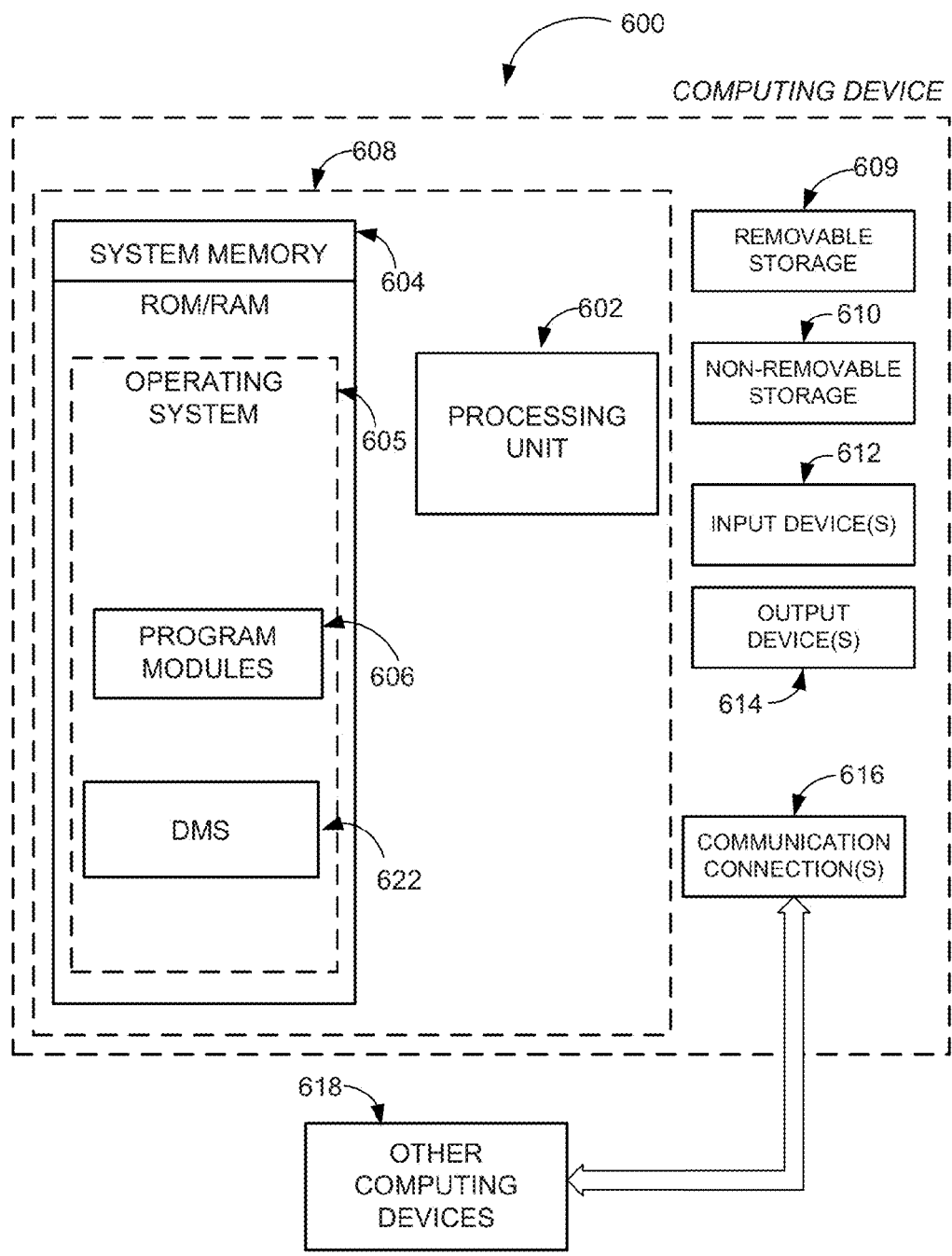
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606 and datacenter management service 622.

Datacenter management service 622 may automate datacenter management tasks that are performed across multiple technology silos and datacenter servers or collections of servers by integrating heterogeneous task providers and implementations into a set of standardized adapters through dependency inversion. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic. RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
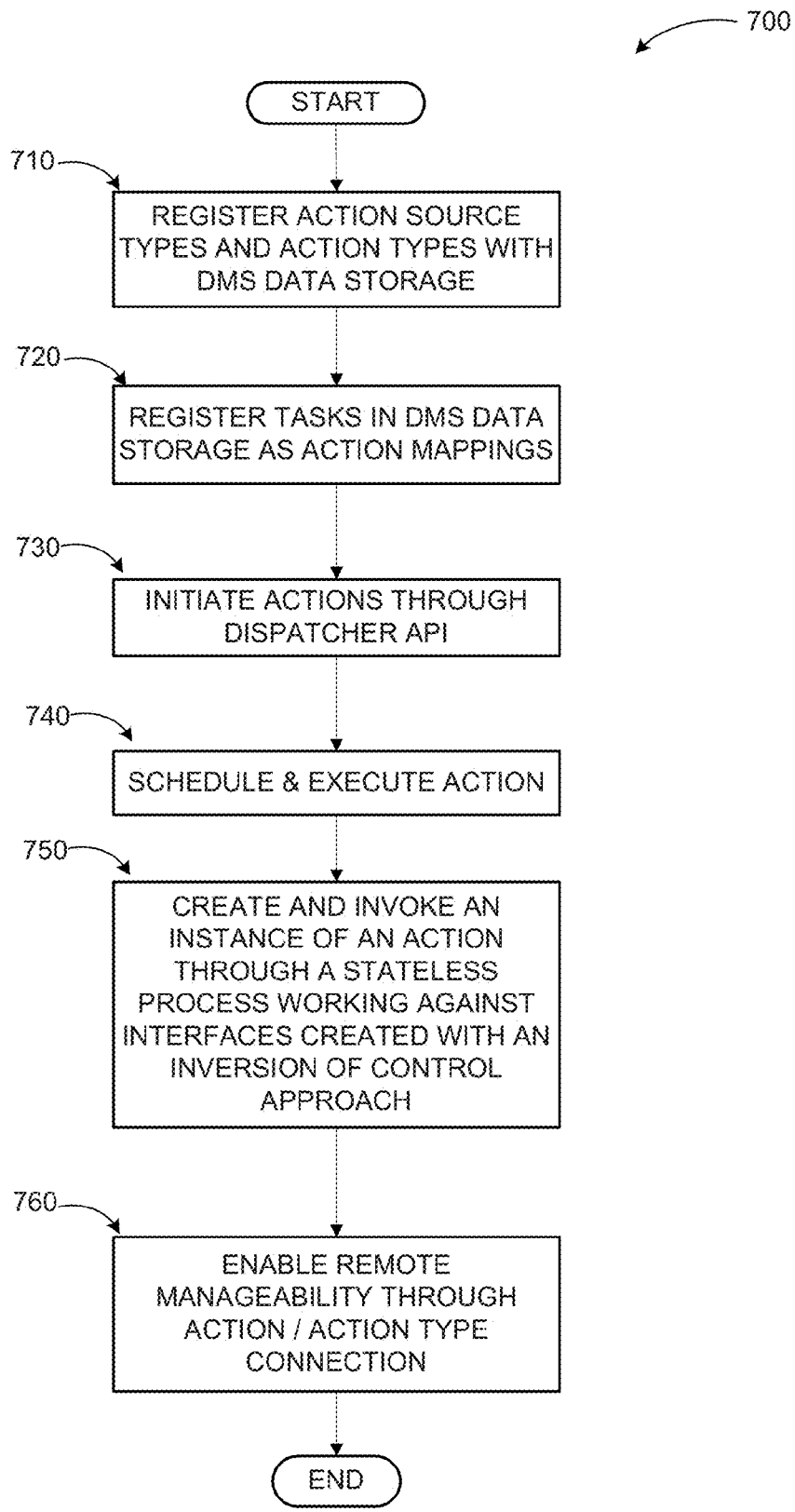
FIG. 7 illustrates a logic flow diagram for a process of task execution through dependency inversion in an optimized datacenter management service according to embodiments.

FIG. 7 illustrates a logic flow diagram for process 700 of task execution through dependency inversion in an optimized datacenter management service according to embodiments. Process 700 may be implemented by a datacenter management service in some examples.

Process 700 may begin with operation 710, where ActionSource Types and Action Types are registered with a DMS data storage including a reference to the assemblies that implement the interfaces for these types and optional initialization parameters. At operation 720, tasks may be registered with the DMS data storage as Action Mappings by a unique ID and associated with an ActionSource Type and an Action Type and optional rules and initialization parameters governing the behavior of the Action Mapping.

At operation 730, the Actions may be initiated through a Dispatcher API by any application or service using the unique Action Mapping ID. ActionSource and Action data based instances may also be created in DMS data storage based on the data in the Action Mapping and rules governing whether or not the action can be created may be applied.

At operation 740, an Action may be scheduled for execution by the Action Scheduler Service and then subsequently executed by the Execute Ready Service through the Action Invoker. Rules governing whether or not the action can be executed may also be applied. At operation 750, the Action Invoker Application may be called by the Execute Ready Service and is provided with the data to create and invoke an instance of the Action through a stateless process working against the IAction and IActionSource interfaces of the Action and ActionSource instances that are created using the 'Inversion of Control' approach. At optional operation 760, remote manageability may be enabled through implementing the Action instance by Action Type, which includes the code for remote manageability.

In a system according to embodiments, datacenter tasks may be centrally integrated and handled from any task source to any server or servers and technology. An extensible design enables integration with arbitrary tasks implementers and integration with arbitrary source providers. Furthermore, a unified model may be used for executing a task against any technology and one or more servers with a common interface. An integrated RBAC provider enables resource access requirements to be scoped per task instead of per resource, server, or technology. Moreover, automatic task sequencing on individual target servers may ensure fully check-pointed changes to the servers.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Optimized datacenter management by centralized task execution through dependency inversion may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for providing optimized datacenter management by centralized task execution, the method comprising:
   registering with a DMS data storage one or more adapters;
   registering at least one of tasks and incident remediations with the DMS data storage as action mappings;
   including a remote manageability layer in an action wherein the remote manageability layer varies based on one of the adapters and one of the tasks associated with the action;
   mapping an alert type of a detected alert to an action type of the action associated with the alert to reference the action throughout a lifecycle of the alert;

enabling initiation of the action by one of an application and a service through a dispatcher application programming interface (API) using an action mapping identifier associated with at least one from a set of: a source type, an action type, a rule, and an initialization parameter governing a behavior of the action mappings;

scheduling the initiated action for execution by a scheduler service;

executing the scheduled action by an execute ready service;

invoking an instance of the scheduled action by an action invoker application through a stateless process providing data for creating and invoking the instance of the scheduled action to the action invoker application, the action invoker application working against one or more interfaces of the action instance and an instance of an action initiator that are created using an inversion of control approach enabling the adapters to be executed and integrated without DMS code changes; and employing automatic task sequencing on individual target servers to ensure check-pointed changes to the target servers.

2. The method of claim 1, further comprising:
enabling connection pooling and indirect communication to a source interface configured to enable initiation and tracking of actions in an event that the source interface references a task initiator that cannot be called directly by a service in the DMS.

3. The method of claim 1, further comprising:
applying a rule governing whether or not the action can be created when the dispatcher API is called.

4. The method of claim 3, further comprising:
verifying a permission to perform a task through a role based access control (RBAC) provider when the dispatcher API is called.

5. The method of claim 1, further comprising:
executing a plurality of concurrent actions based on a configurable pool of actions.

6. The method of claim 1, further comprising:
recording a history and a status of the action in DMS data storage and making available based on a source interface implementation.

7. The method of claim 1, wherein the action invoker application works against an IAction and an IActionSource interface of the action instance.

8. The method of claim 1, wherein the action initiator instance is a source instance configured to initiate an action.

9. The method of claim 8, wherein the source instance is an ActionSource instance configured to track one or more actions, and wherein the source instance is controlled by a source factory.

10. The method of claim 1, wherein the adapters include action types and source types.

11. The method of claim 10, wherein the action types and source types are integrated with the DMS through implementation of IAction and IActionType interfaces.

12. The method of claim 1, wherein an auditor component of the dispatcher API is configured to provide a write status to the DMS.

13. The method of claim 1, further comprising:
monitoring and logging a health of DMS services into the DMS data storage; and
broadcasting a message to find DMS services without preknowledge of a DMS configuration.

14. The method of claim 1, wherein the source type is integrated with the DMS through implementation of a source interface and a source type interface, and the action type is integrated with the DMS through implementation of the one or more interfaces of the action instance and the action initiator instance.

15. The method of claim 1, wherein the dispatcher API is configured to initiate automation from a generic source for any task without first having to implement a specific action instance.

16. A computing device for providing optimized datacenter management by centralized task execution, the computing device comprising:
a memory storing instructions; and
a processor coupled to the memory, the processor executing a datacenter management service (DMS) in conjunction with the instructions stored in the memory, wherein the DMS is adapted to:
register with a DMS data storage source types and action types;
register at least one of tasks and incident remediations with the DMS data storage as action mappings;
include a remote manageability layer in an action wherein the remote manageability layer varies based on one of the action types and one of the tasks associated with the action;
map an alert type of a detected new alert to one of the action types of an action associated the alert to reference the action throughout a lifecycle of the alert;
enable initiation of the action by one of an application and a service through a dispatcher application programming interface (API) using an action mapping identifier associated with at least one from a set of: a source type, an action type, a rule, and an initialization parameter governing a behavior of the action mappings;
schedule the initiated action for execution by a scheduler service;
invoke an instance of the scheduled action by an action invoker application through a stateless process providing data for creating and invoking the instance of the scheduled action to the action invoker application, the action invoker application working against one or more interfaces of the action instance and an instance of an action initiator; and
execute the scheduled action by an execute ready service by employing automatic task sequencing on individual target servers to ensure check-pointed changes to the target servers.

17. The computing device of claim 16, wherein the execute ready service is configured to call the action invoker application and provide the data for creating and invoking the instance of the action using the stateless process.

18. The computing device of claim 16, wherein the DMS is further adapted to:
employ automatic task sequencing on individual target servers.

19. The computing device of claim 16, wherein the DMS is structured in an extensible manner to enable integration with at least one of an arbitrary task implementer and an arbitrary source provider.

20. The computing device of claim 16, wherein the DMS employs a unified model for executing a task against one or more servers with a common interface.

21. The computing device of claim 16, wherein the DMS includes an integrated role based access control (RBAC) provider that enables resource access requirements to be scoped per task.

22. The computing device of claim 16, wherein the DMS includes a monitoring service for monitoring a source type to dispatch actions and an action dispatching service for initiating an automation for a given source type.

23. The computing device of claim 22, wherein the monitoring service and the action dispatching service are implemented a source integrator.

* * * * *